United States Patent Office.

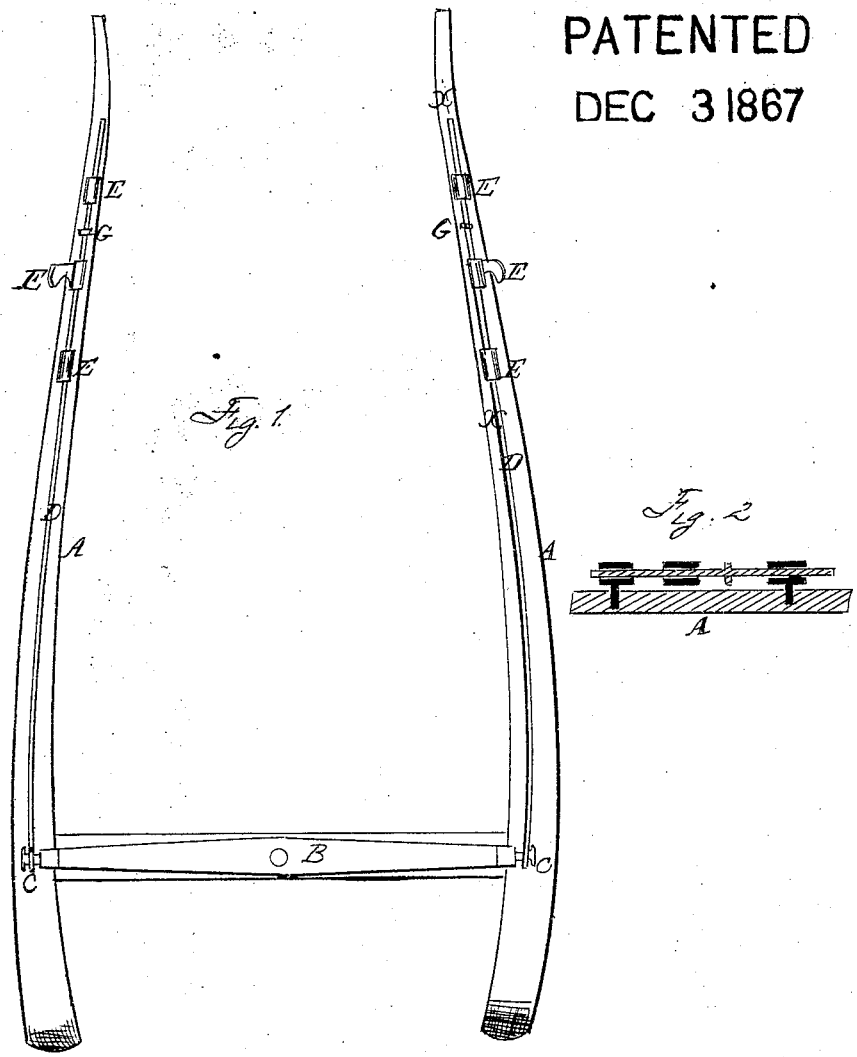

JACKSON GORHAM, OF BAIRDSTOWN, GEORGIA, ASSIGNOR TO HIMSELF AND JOHN ARMSTRONG, OF SAME PLACE.

*Letters Patent No. 71,741, dated December 3, 1867.*

IMPROVEMENT IN SHAFT-ATTACHMENT TO CARRIAGES.

*The Schedule referred to in these Letters Patent and making part of the same.*

TO ALL WHOM IT MAY CONCERN:

Be it known that I, JACKSON GORHAM, of Bairdstown, in the county of Oglethorpe, and State of Georgia, have invented a new and improved Attachment to Carriages; and I do hereby declare that the following is a full, clear, and exact description thereof, which will enable others skilled in the art to make and use the same, reference being had to the accompanying drawings, forming part of this specification.

The present invention relates to an attachment to carriages, or, more especially, buggies, the object of which is to simplify the fastening of the trace and hold-back straps thereto, and the unfastening of the same therefrom, which result is satisfactorily accomplished, as will be obvious from the following description of the same, reference being had to the accompanying plate of drawings, in which—

Figure 1 is a plan or top view of the shafts to a buggy or other similar carriage, and Figure 2 a detail section in plane of the line $x\ x$, fig. 1.

Similar letters of reference indicate like parts.

A, in the drawings, represents the shafts to a buggy or other similar carriage; B, the whiffle-tree, hung thereto in the ordinary manner, and provided at each end with a hook, $c$; D, rods hung by an eye, at one end, to the whiffle-tree hooks, from which they extend along the upper side of the shafts through eyes or guide E of the same, at or near their forward ends. F, hooks hung on rods D, so as to slide thereon between the guides through which they pass. G, collars secured to rods D between the said guides, against which the said hooks come to a bearing as they move or slide forward, and thus moving the said rods through them, either one or the other swinging the whiffle-tree upon its centre-pin or pivot. To the hook $c$ the trace and hold-back straps are both hitched, and through such hooks and the rods the traces and hold-back straps both act in a similar manner to that where they are hung in the ordinary way.

I claim as new, and desire to secure by Letters Patent—

The attachment to carriage-shafts, consisting of rods having hooks, and hung to the whiffle-tree and sliding hooks, substantially as and for the purpose described.

JACKSON GORHAM.

Witnesses:
    P. M. STEVENS,
    O. A. McLAUGHLIN.